United States Patent [19]

Parker

[11] 3,927,355

[45] Dec. 16, 1975

[54] DIODE STACK WITH SEGMENTED MOUNTING PLATE

[75] Inventor: Frank S. Parker, Bay City, Mich.

[73] Assignee: Newcor, Inc., Bay City, Mich.

[22] Filed: Feb. 25, 1974

[21] Appl. No.: 445,481

[52] U.S. Cl. .................. 317/100; 357/76; 174/15 R; 321/8 C

[51] Int. Cl.$^{2}$ .................. H01L 23/34

[58] Field of Search ............. 317/99, 100; 174/15 R, 174/16 R, DIG. 5; 321/8 C; 310/68 D; 357/76, 81, 82, 75

[56] References Cited

UNITED STATES PATENTS

| | | | |
|---|---|---|---|
| 3,143,592 | 8/1964 | August | 357/82 |
| 3,356,904 | 12/1967 | Yonkers | 317/100 |
| 3,364,987 | 1/1968 | Bylund | 174/16 R |
| 3,553,505 | 1/1971 | Sato | 310/68 D |
| 3,573,569 | 4/1971 | Davis | 321/8 C |
| 3,652,903 | 3/1972 | Eriksson | 174/15 R |

*Primary Examiner*—Gerald P. Tolin
*Attorney, Agent, or Firm*—Woodhams, Blanchard and Flynn

[57] ABSTRACT

A power pack assembly, usable for example in welding, having a transformer, includes at least a pair of rectifier units coupled to secondary conductors thereof. The rectifier units each includes a spaced pair of substantially parallel mounting plates having a plurality of diode stacks sandwiched therebetween. One of the mounting plates is segmented between each pair of diode stacks to permit flexing of the resulting segments thereof axially of the diode stacks. Means are provided for clamping the mounting plates fixedly with respect to each stack of diodes, whereby the flexibility of the segments of the segmented plate allows same to accommodate to varying axial dimensions of the several diode stacks.

10 Claims, 6 Drawing Figures

DIODE STACK WITH SEGMENTED MOUNTING PLATE

FIELD OF THE INVENTION

This invention relates to a diode mounting assembly and particularly to a type thereof adapted for mounting multiple groups of diodes for a rectifier and including means for automatically compensating for differences in thicknesses of same.

BACKGROUND OF THE INVENTION

In the design of large rectifiers, such as those used for supplying direct current welders, it is common to connect in parallel a plurality of stacks of diodes and then to connect the corresponding ends of the parallel arranged stacks to each other. The opposite ends of the so-connected diodes are then connected into the welding circuit as desired.

In arranging such diodes it is known that same are often, as a result of their manufacturing process, of slightly varying thicknesses and yet at the same time it is essential that they be clamped together under equal and controlled pressures from one stack to the next in order to assure that each stack carries the same amount of current as every other stack.

It is desirable, from the standpoint of convenience in assembly and mounting, to arrange said stacks of diodes between bus bars or between plates. However, when such is done, it is difficult to compensate for the varying thicknesses of the diodes without also causing different clamping pressures on the respective stacks and resulting different currents therethrough. On the other hand, to provide individual shimming or other adjustment for the respective stacks is time consuming and therefore expensive.

Accordingly, the objects of the invention include:

1. To provide apparatus for mounting stacks of parallel connected diodes, as in a rectifier, which will automatically compensate for minor differences in thicknesses of said diodes and thereby automatically cause same to be clamped between appropriate holding means with at least substantially equal pressures.

2. To provide apparatus, as aforesaid, which will secure the above-mentioned equal pressures without requiring other than minor, if any, individual adjustment for respective stacks of diodes to insure each of said stacks being clamped with a controlled pressure equal to that of every other stack.

3. To provide apparatus, as aforesaid, into which the diode stacks can be clamped rapidly and efficiently on a production-line basis.

4. To provide apparatus, as aforesaid, which will result in a rectifier, comprising parallel connected stacks of diodes, which can be handled as a unit and connected as a unit into an appropriate circuit, as a welding cirucit, as desired.

5. To provide apparatus, as aforesaid, which will automatically compensate itself for changes in temperature and accordingly maintain said stacks of diodes under respectively equal pressures even at varying operating temperatures of the apparatus.

SUMMARY OF THE INVENTION

Briefly, the invention contemplates clamping a plurality of stacks of diodes between a pair of plates, which in the illustrated embodiment are circular plates. Such plates are conductive and constitute the conductive means by which the corresponding ends of the diode stacks are connected to each other. At least one of said plates is segmented by radially extending slots and a separate segment in provided for each stack of diodes. Thus, said segments may deflect in an axial direction independently of each other sufficiently to permit the segmented disk to accommodate diode stacks of slightly different respective lengths. Any convenient means may be used to apply clamping pressures to the diode stacks and the flexing of the segments insures that the effective clamping pressures are equal from one segment to another. In the illustrated embodiment the other of said two plates is made solid. However, if desired, both plates may be segmented.

Other objects and purposes of the invention will be apparent to persons acquanited with apparatus of this kind upon reading of the following specification and inspection of the accompanying drawings.

DETAILED DESCRIPTION

Figures 1, 2, 5, 6:
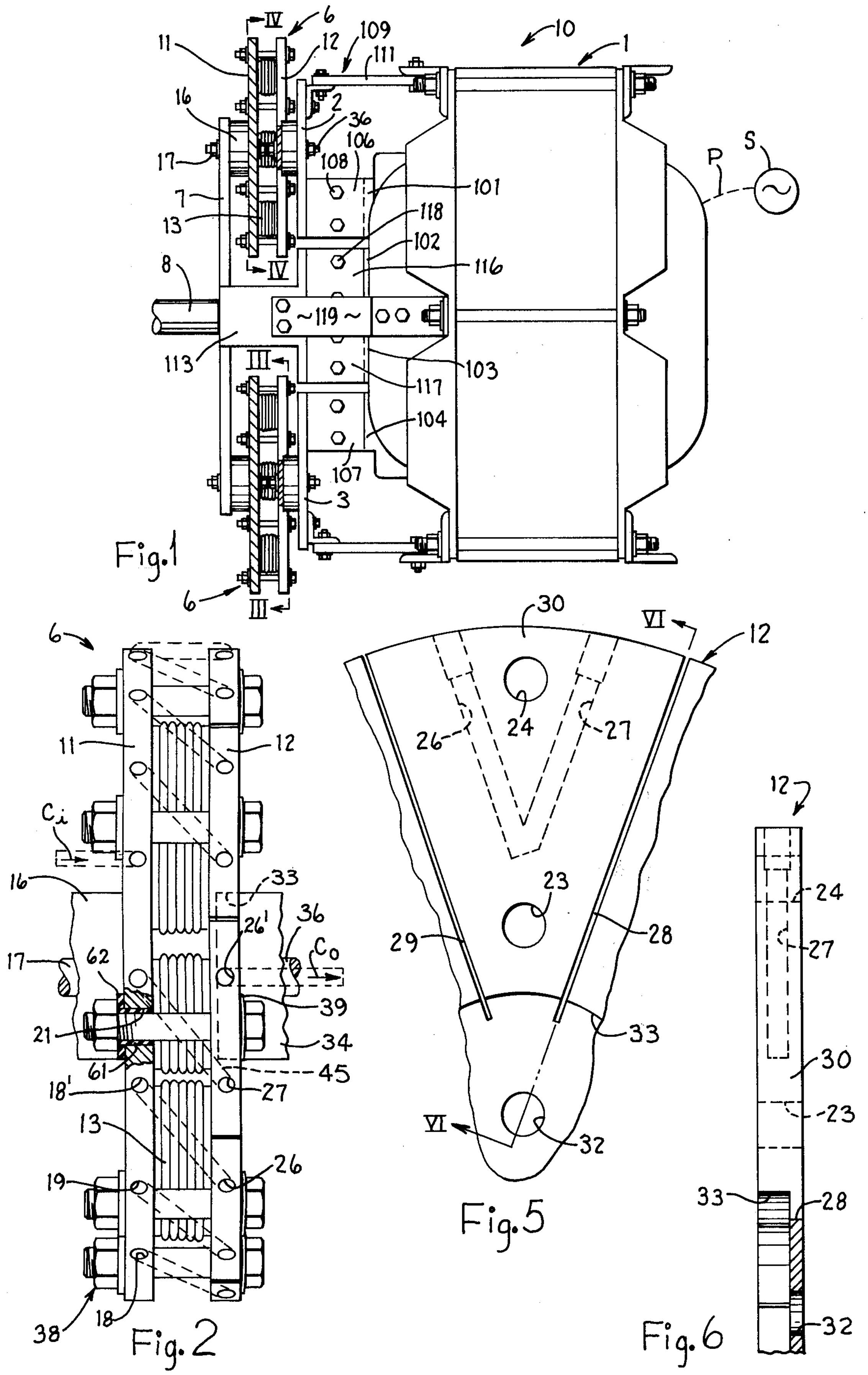
FIG. 1 is a side elevational view of a power pack assembly for a welding machine, showing rectifier units installed in positions of use.
FIG. 2 is an enlarged, fragmentary and partially broken side elevational view of one of the rectifier units shown in FIG. 1.
FIG. 5 is an enlarged fragmentary view showing a single segment of the segmented plate of FIG. 3.
FIG. 6 is a fragmentary sectional view substantially taken on the line VI—VI of FIG. 5 and showing an edge of the segment appearing in FIG. 5.

FIG. 1 discloses, in a somewhat schematic manner, a power pack 10 comprising a transformer 1 of any convenient type. The transformer 1 is providable with a conventional connection, indicated by broken line P, to a suitable AC source S. Secondary winding output conductors 101–104 extend leftwardly from the transformer 1. Platelike conductors 2 and 3 are leftwardly spaced from and face the transformer 1 and are provided with generally rightwardly extending flanges 106 and 107, respectively. The flanges 106 and 107 overlap and conductively abut opposite polarity transformer secondary conductors 101 and 104, respectively, and are secured thereto, as by screws 108. The platelike conductors 2 and 3 are, in the particular embodiment shown, each braced with respect to the transformer 1 by suitable bracing generally indicated for example at 109, provided with an insulative portion 111. Rectifier units 6, here two thereof, are supported and supplied electric current by the platelike conductors 2 and 3, and are disposed with their rightward, input sides facing such platelike conductors. The leftward, output sides of the rectifier units 6 are conductively connected to each other by an elongate platelike conductor 7.

A platelike common conductor 113 is adjacent the rectifier output conductor 7 and is conductively coupled, by means including flanges 116 and 117 and screws 118, to remaining transformer secondary conductors 102 and 103. A stepped insulative brace 119 rigidifies the location of the common conductor 113 with respect to the transformer 1. The rectifier output conductor 7 and common output conductor 113 may be conventionally connected, by means not shown, to corresponding conductors of a flexible cable 8, which may be used, for example, for conducting rectified electrical current through a welding unit.

The rectifier units 6 are preferably identical and one thereof, for example the upper one in FIG. 1, is disclosed in detail in FIGS. 2–6. Such rectifier unit 6 comprises a spaced pair of parallel mounting plates 11 and 12, between which is arranged a plurality of rectifier stacks 13. The rectifier stacks 13 comprise disklike diodes, sometimes referred to as being of the "hockey puck" type, which have been found frequently to vary in thickness.

The mounting plates 11 and 12 (FIGS. 2 and 4) are of electrically conductive material, such as copper or aluminum, and preferably are circular and of sufficient thickness to provide the desired stiffness, in this embodiment one-half inch thick for an 11-inch diameter plate.

A central opening 14 is provided in the mounting plate 11. A conductive block 16 is adapted to be sandwiched between the rectifier output conductor 8 and a smoothly finished central portion of the mounting plate 11 to effect a conductive connection therebetween. Any convenient fastening means, such as the nut and bolt arrangement 17, may be passed through the central opening 14 in mounting plate 11, the block 16 and the rectifier outlet plate 7 to effect the mounting of the plate 11 as aforesaid.

The mounting plate 11 may be provided with appropriate cooling water conduits or passages, preferably in the V-shape at 18 and 19 (FIG. 4), same being externally connected in any convenient manner. Pairs of bolt holes 21 and 22 are provided in the mounting plate 11 for fastening the rectifier stacks 13 in place, one of said bolt openings being located radially inwardly and one radially outwardly of each respective diode stack location. The passages 18 and 19 extend inwardly from the periphery of the mounting plate 11, past and on opposite sides of the outer bolt hole 21, and converge toward the inner bolt hole 22. Such passages extend inwardly over a major portion of the location of the corresponding stack 13 and meet thereover.

The mounting plate 12 (FIGS. 3, 5 and 6) comprises a partially segmented plate and a central recess or counterbore 33 having a central opening 32 therethrough. A plurality of radial cuts, of which two are indicated at 28 and 29, in this embodiment extend from the periphery of mounting plate 12 a short distance into the counterbore 33. Such radial cuts are preferably evenly distributed around the circumference of the mounting plate 12 and define therebetween a plurality of preferably identical segments. The segments are connected at their inner ends by the reduced thickness central portion of the plate defined by the inner portion thereof adjacent the counterbore 33. The width of said cuts is sufficient to provide ample space between the segments 30, to insure freedom of flexing of each of said segments, particularly to insure that said segments remain free to flex as portions of the apparatus change temperature in operation.

The flexibility of each segment 30 is enhanced by extension of the cuts 28 and 29 partially into the counterbore 33, at least insofar as flexing in a direction axially with respect to the counterbore 33 is concerned.

Each segment 30 is of sufficient width to cover the end of one diode stack 13. Hence, the number of segments 30 in mounting plate 12 is equal to the number of diode stacks in the corresponding rectifier unit 6. A pair of bolt openings 23 and 24 are provided in each segment 30, one thereof being located radially inwardly and one radially outwardly of the location provided for the corresponding diode stack 13. Each set of bolt openings 23 and 24 is coaxial with a corresponding set of the bolt openings 21 and 22 in the other mounting plate 11 when the rectifier unit 6 is assembled. Further conduits or passages 26 and 27, are provided in each segment 30 for cooling and same may be connected externally in any desired manner. The passages 26 and 27 are preferably located and connected in the manner above described with respect to passages 18 and 19 in mounting plate 11.

The segmented plate 12 is arranged on a conductive cylindrical mounting block 34 and fixed to the corresponding power pack plate 2 by suitable means such as a bolt and nut arrangement 36 extending through mounting plate hole 32 and similarly through mounting block 34 and plate 2. The mounting block 34 is positioned within the recess 33 with a nominal clearance between it and the wall of the recess so as not to restrict the flexibility of the segments.

Plural clamping means are provided for securing the diode stacks 13 in sandwiched relation between the mounting plates 11 and 12 and are here shown as bolt and nut arrangements 37 and 38. Each such bolt and nut arrangement is provided with resilient tensioning means, here a Belleville washer 39.

Figures 3, 4:
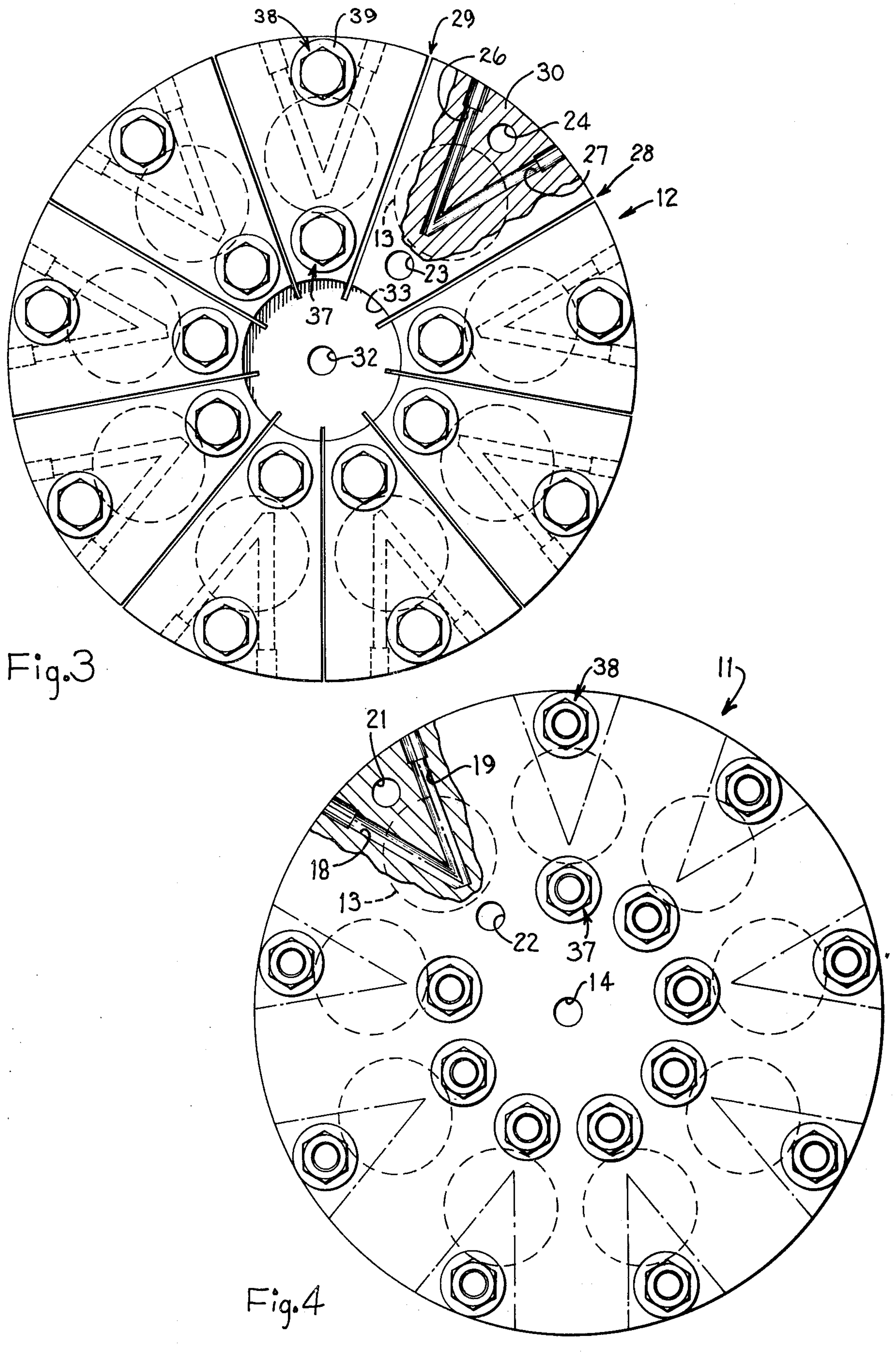
FIG. 3 is a partially broken view of said rectifier unit substantially corresponding to the line III-III of FIG. 1.
FIG. 4 is a partially broken view of the rectifier unit substantially corresponding to the line IV—IV of FIG. 1.

In the preferred embodiment shown, the mounting plates 11 and 12, the bolt holes 22, 21 and 23, 24 and the arrangement of diode stacks 13 between such mounting plates are all circular in configuration or arrangement, as shown in FIGS. 3 and 4.

With the plurality of clamping devices 37 arranged in the inner circles of openings 22 and 23 in mounting plates 11 and 12, respectively, the diode stacks 13 are positioned between such mounting plates as shown in FIGS. 2–4 and the further clamping devices 38 are located immediately outward of each diode stack 13, extending through the outer circles of holes 21 and 24. With all the diode stacks 13 thus in place, the clamping devices 37 and 38 are tightened as required, preferably by such tightening-controlling means as a torque wrench, to insure that all clamping devices are tightened to the same degree.

It will be recognized that, upon such tightening, the several segments of the segmented plate 12 will flex axially as needed to accommodate varying thicknesses of the diode stacks 13 and that with the fastening devices 37 and 38 all tightened wti the same force, each diode stack will be subjected to the same clamping pressure as all the rest of the diode stacks. Thus, electric current conduction will tend to be of the same amplitude through all of the diode stacks 13.

With both the plates 11 and 12 provided withe cooling passages as discussed, the diode stacks may be advantageously cooled on both sides thereof. Coolant may be applied to the coolant passages in mounting plates 11 and 12 in any convenient fashion. In the preferred embodiment however, and as indicated in broken lines for example at 45, external coolant hoses or the like extend in angled fashion between the plates 11 and 12 to interconnect the skewed pairs of openings 19, 27 and 18, 26 to provide for movement of coolant fluid circumferentially around the rectifier unit 6. Adjacent passages in the plates 11 and 12 are connected to a coolant inlet hose and coolant outlet hose as generally indicated at 18' and 26', such hoses flowing coolant fluid as indicated by arrows $C_i$ and $C_o$ and being connectible to a suitable coolant source, not shown.

In the embodiment shown in FIG. 2, a single inlet hose and a single outlet hose serve the angled hoses 45 ringing the periphery of the rectifier unit 6. However, it is recognized that more uniform cooling of the rectifier unit 6 can be achieved where desired, by dividing the set of angled hoses 45 into several (for example three) circumferential sections and serving each section of angled hoses 45 with a separate coolant inlet and outlet.

Alternatively, however, if in a given installation it is feasible to flood the entire diode mounting assembly with an electrically nonconductive cooling liquid, the several passages 18, 19 and 26, 27 may be eliminated and the thickness of the mounting plates 11 and 12 may be appropriately reduced, whereby to provide a still lighter and more space-saving construction.

It will be understood that the plates 11 and 12 of the rectifier unit 6 are electrically isolated from each other, except for the electrical connection established therebetween by the several diode stacks 13. To this end, the adjacent ends of the nut and bolt arrangements 17 and 36 are spaced from each other. Further, the angle coolant hoses 45 are of nonelectrically conductive material. Further, the clamping nut and bolt arrangements 37 and 38 effect a nonelectrically conductive connection between the mounting plates 11 and 12. The latter can be accomplished by use of nonelectrically conductive bolts, for example of a suitable synthetic resin material. However, in the preferred embodiment shown in FIG. 2, the clamping bolt holes of at least one of the mounting plates are provided with suitable insulative liner and washer means. More particularly, as shown in FIG. 2, the outer bolt holes 21 (and correspondingly the inner bolt holes 22) of the mounting plate 11 are provided with an insulative sleeve 61 and outwardly facing insulative washer 62 for isolating the corresponding nut and bolt arrangement 38 (and correspondingly 37) electrically from such mounting plate 11.

Where there is a wide discrepancy in the axial lengths of the several diode stacks 13, the flexibility of mounting may be increased by making both of the plates 11 and 12 segmented, as shown for plate 12, without adversely effecting the cooling capacity of the structure or the convenience in mounting same as above described. It is further contemplated that, if desired, the location of the plates 11 and 12 may be reversed.

While circular mounting plates, as shown, provide most effecient geometry for insuring equal current flow through the several diode stacks 13, it will of course be possible, where other considerations predominate, to instead provide mounting plates of other geometric shapes as desired, such as oval or rectangular and to correspondingly alter the locations of diode stacks sandwiched therebetween.

As indicated above, the disklike diodes of the diode stacks 13 are of known type and are exemplified by the General Electric type A570 or Westinghouse R720.

Although a particular preferred embodiment of the invention has been disclosed in detail for illustrative purposes, it will be recognized that variations of modifications of the disclosed apparatus, including the rearrangement of parts, lie within the scope of the present invention.

The embodiments of the invention in which an exclusive property or privilege is claimed are defined as follows:

1. A rectifier unit, comprising:

a spaced pair of substantially parallel mounting plates having a plurality of diode stacks positioned therebetween, one of said plates comprising slots through the thickness thereof and between adjacent diode stacks, and interconnected, substantially axially flexible segments facing said diode stacks and having edges separated by said slots;

means clamping said plates fixedly with respect to each stack of diodes;

whereby the flexing of the segments of the segmented plate will accommodate the same to varying axial dimensions of the several diode stacks.

2. The device of claim 1 wherein said diode stacks are spaced in a regular pattern around said mounting plates, the segments of such segmented plate being of equal width, said stacks and clamping means engaging said segments between said slots and being spaced along the slots.

3. The device of claim 2 wherein said regular pattern is a circle and said slots extend radially inwardly from the circumference of said one plate.

4. The device of claim 1 wherein said clamping means include means individually connecting each segment to the opposed portion of the other of said mounting plates, said other mounting plate receiving the connecting means of all said segments.

5. The device of claim 4 wherein said clamping means are nut and bolt arrangements each engaging a corresponding segment and opposed plate portion and each including a spring washer for maintaining pressure on the diode stack positioned between the corresponding segment and opposed portion of said other plate.

6. The device of claim 1 including a central counterbore in said segmented plate for receiving a mounting block thereinto and a central opening through said segmented plate for reception of fastening means by which said segmented plate may be fastened to said mounting block, said slots having inner ends in said counterbore and spaced from said central opening.

7. The device of claim 1 in which each segment of said segmented plate includes a coolant passage therein, said coolant passage having an inlet and outlet respectively extending along said slots in spaced relation thereto.

8. A rectifier unit, comprising:

a spaced pair of substantially parallel mounting plates having a plurality of diode stacks positioned therebetween, one of said plates being segmented between adjacent diode stacks to permit flexing of resultant segments thereof in a direction axially of the diode stacks, said mounting plates being circular and substantially of equal diameter, each of said plates being provided with a central opening therethrough, the segmented one of said mounting plates being provided with a central recess facing away from the other of said mounting plates;

first and second mounting blocks substantially coaxially positioned with respect to the outer radial faces of said segmented and other mounting plate, respectively, said first mounting block being received in said central recess in clearance relation with the recess wall for free segment flexing, first and second fastening means for securing said first and second mounting blocks to said segmented and other plates, said segments of said segmented plates being substantially pie-shaped and of equal width and separated by radially extending slots, said slots extending partially into said central recess but being radially outwardly spaced from said central opening of said segmented plate, each said rectifier stack engaging a corresponding segment substantially centrally thereof;

means clamping said plates fixedly with respect to each stack of diodes, said clamping means comprising nut and bolt connections extending through said segmented and other plate, a pair of such nut and bolt connections being provided in each said segment, such nut and bolt connections being spaced both inboard and outboard of the corresponding diode stack and each being provided with a spring washer for applying a resilient pressure to such corresponding diode stack, each of said mounting plates being provided with a plurality of substantially V-shaped, outwardly divergent coolant passage means overlying the end of the adjacent diode stack;

whereby the flexing of the segments of the segmented plate will accommodate same to varying axial dimensions of the several diode stacks.

9. The device of claim 8 including hose means interconnecting peripherally located outlets of said passage means and extending across the gap between said segmented and other mounting plate for flowing coolant fluid past each end of each of the diode stacks.

10. A power pack assembly, comprising:

a transformer having plural secondary output conductors;

at least a pair of rectifier units each having an input and output side, said rectifier units being spaced from said transformer secondary conductors;

conductive plate means conductively coupling some of said secondary conductors to the input side of each of said rectifier units, and further conductive plate means coupling the remaining secondary conductors to a common conductor for determining a current flow path through each said rectifier unit and the common conductor and for supporting each said rectifier units and said common conductor;

insulative brace means for supporting said rectifier units and common conductor with respect to said transformer;

a rectifier output conductor connected to the output side of each rectifier unit;

means conductively engaged with said rectifier output conductor and common conductor for applying rectified current flow to a load;

a said rectifier unit comprising a spaced pair of substantially parallel mounting plates at the input and output sides thereof and a plurality of diode stacks therebetween, one of said plates comprising axially flexible segments independently engaging corresponding diode stacks, and means clamping said diode stacks in fixed engagement between corresponding segments and the other said plate.

* * * * *